United States Patent [19]
Harper, Jr.

[11] 3,916,257
[45] Oct. 28, 1975

[54] MOTOR PROTECTOR
[75] Inventor: Walter R. Harper, Jr., Barrington, R.I.
[73] Assignee: Texas Instruments Incorporated, Dallas, Tex.
[22] Filed: Dec. 20, 1973
[21] Appl. No.: 426,972

[52] U.S. Cl. .......... 317/13 C; 317/40 R; 318/225 A; 337/86; 337/89
[51] Int. Cl.² .......................................... H02H 7/08
[58] Field of Search ....... 318/225 R, 225 A; 337/96, 337/86, 89; 317/13 R, 13 C, 40 R

[56] References Cited
UNITED STATES PATENTS
2,782,353 2/1957 Seely ............................ 318/225 A
3,470,513 9/1969 Shockroo et al. ..................... 337/86

*Primary Examiner*—James D. Trammell
*Attorney, Agent, or Firm*—John A. Haug; James P. McAndrews; Russell E. Baumann

[57] ABSTRACT

A protector for a multiphase dual voltage electric motor, each winding phase of which comprises two winding sections adapted to be shunt-connected when energized by a power source of a first lower voltage level and to be serially connected when energized by a power source of a second higher voltage level substantially double that of said first level. The protector comprises a snap-acting dish-shaped body comprising at least two layers of metallic material having different coefficients of thermal expansion and which has a first curvature at ambient temperatures and abruptly reverses its curvature when heated above a predetermined temperature. Electrical resistance heater means are carried by the snap-acting body in heat-exchange relationship therewith. A plurality of contact means are electrically connected to the heater means and supported thereby. The contact means are simultaneously movable by the snap-acting body from respective first positions when the snap-acting body is in its first curvature position to respective second positions when the body reverses curvature in response to the body being heated above the predetermined temperature. A pair of contacts is associated with each contact means. One contact of each pair is connected to one end of a winding section of a respective winding phase. The other contact of each pair is connected to one end of a winding section of an adjacent phase winding when the motor is energized by the lower voltage level power source but is electrically disconnected from all winding sections when the motor is energized by the higher voltage level power source. Each of the pairs of contacts is mutually contacted by its respective contact means when the latter are in their first positions and is mutually isolated therefrom when the contact means are simultaneously abruptly moved to their second positions.

10 Claims, 15 Drawing Figures

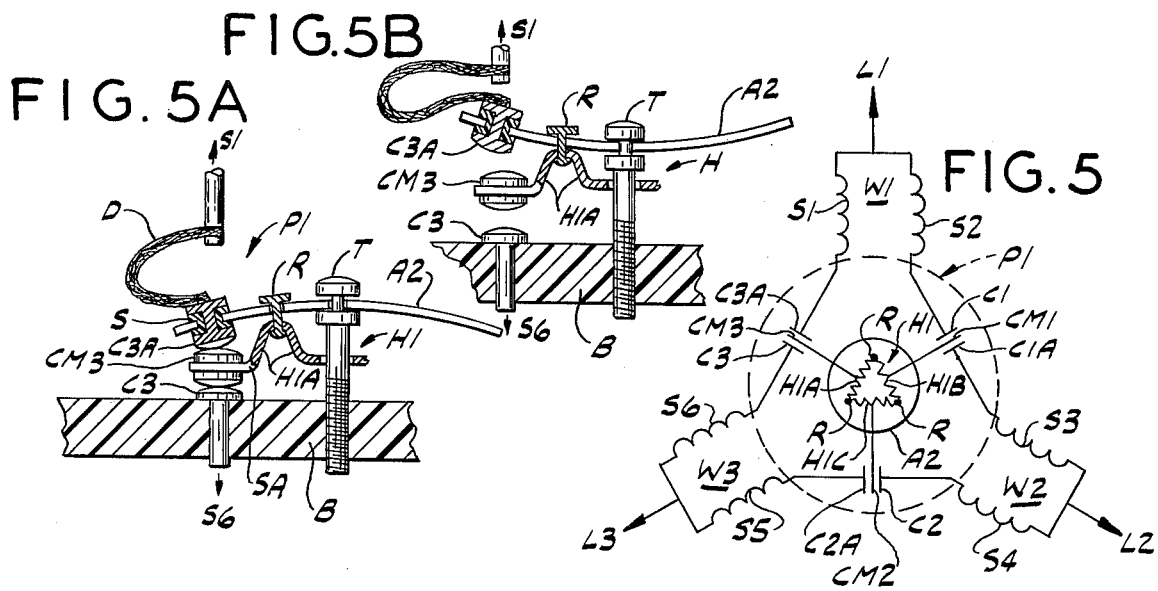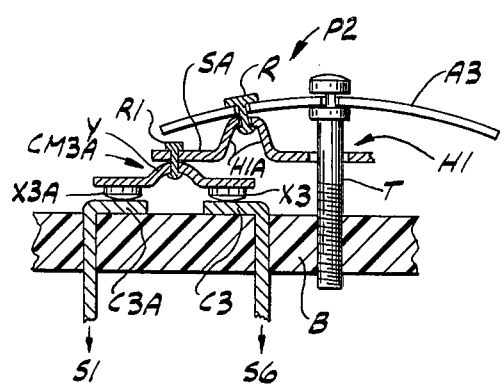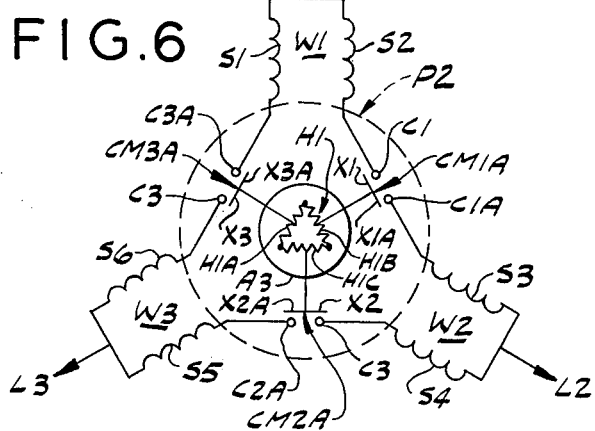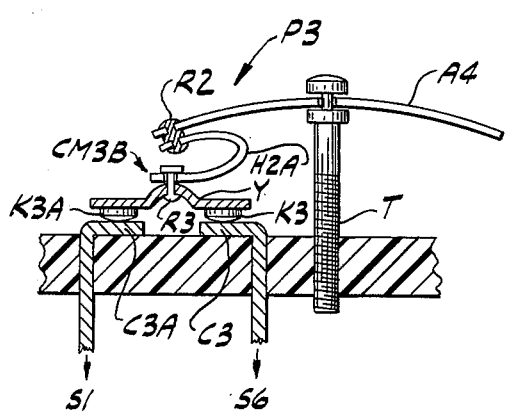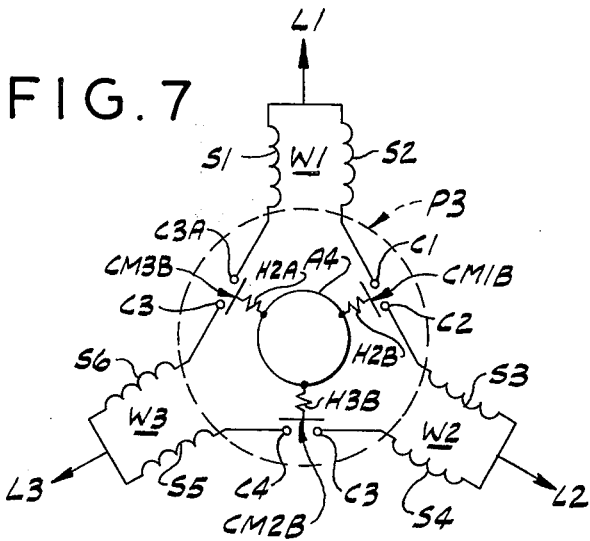

MOTOR PROTECTOR

BACKGROUND OF THE INVENTION

This invention relates to motor protectors and more particularly to protectors for multiphase dual voltage motors.

While prior motor protectors generally operate effectively for single and multiphase single voltage motors, there have been substantial problems in providing motor protectors that will satisfy all of the accepted and increasingly stringent and uprated motor standards and operate satisfactorily with dual voltage multiphase motors when connected alternately to higher and lower voltage power sources. Thus when the dual voltage multiphase motor has the winding sections of each of its phases serially connected for energization by a higher voltage source, the currents through the windings and the heaters typically used as well as the currents traversing the thermally responsive actuator, such as a bimetal disk, are all one value. But when the winding sections of each phase are parallel-connected for energization at the lower voltage level the current through at least the thermally responsive actuator increases substantially and thus causes increased self-heating. As a result there is an inherent derating of the ultimate winding temperature when the motor is connected to the lower voltage. That is, the disk will reach its operation or actuation temperature more quickly and trip before the motor windings have risen to the elevated temperature to which the protector was designed to permit it to rise. But when the motor windings are serially connected to the higher voltage source, the ultimate winding temperature established by tripping of the protector is at the proper level. Another disadvantage of prior protectors for dual voltage multiphase motors is they typically have an elevated heater operating temperature (1,600°-1,800°F.) which increases the frequency of heater burnout. If the heaters are operated at lower temperatures to avoid the heater burnout, then the reduced heat transferred, mainly by radiation, to the disk requires a lowering of the trip temperature thereof. And this in turn makes the protector much more sensitive to room or ambient temperatures and this can cause substantial difficulties by nuisance tripping at high ambients. Also, the prior protectors were somewhat limited as to their mounting locations and several different product lines of protectors had to be designed, fabricated and stocked to accommodate use in the various different motors of different manufacturers.

SUMMARY OF THE INVENTION

Among the several objects of this invention may be noted the provision of thermal protectors for multiphase dual voltage motors that will operate alternately at either voltage without derating the ultimate winding temperature and without having a decreased actuator operating temperature; the provision of such protectors which do not have increased sensitivity to ambient temperatures and are not subject to nuisance tripping; the provision of such protectors that have reduced susceptability to heater burnout; the provision of such protectors that meet the needs of the latest motor designs and standards, simplify application time, and minimize the number of different product lines of protectors needed for use with the various different multiphase dual voltage motors; and the provision of protectors of the class described which may be mounted not only in or on the motor end bells, or in the motor conduit box, but also on the motor winding. Other objects and features will be in part apparent and in part pointed out hereinafter.

Briefly, a protector of this invention comprises a snap-acting dish-shaped body comprising at least two layers of metallic material having different coefficients of thermal expansion and which has a first curvature at ambient temperatures and abruptly reverses its curvature when heated above a predetermined temperature. Electrical resistance heater means are carried by the snap-acting body in heat-exchange relationship therewith. A plurality of contact means, equal in number to the number of winding phases of the motor, are electrically connected to the heater means and supported thereby. The contact means are simultaneously movable by the snap-acting body from respective first positions when the snap-acting body is in its first curvature position to respective second positions when the body reverses curvature in response to the body being heated above said predetermined temperature. A pair of contacts is associated with each contact means. One contact of each pair is connected to one end of one of two winding sections constituting a respective winding phase. The other contact of each pair is connected to one end of a winding section of an adjacent phase winding when the winding sections of each phase are shunt-connected for energization of the motor by a lower voltage level power source but is electrically disconnected from all winding sections when the winding sections of each phase are serially connected for energization of the motor by a higher voltage level power source. Each of the pairs of contacts is mutually contacted by its respective contact means when the latter are in their first positions and is mutually isolated therefrom when the contact means are simultaneously abruptly moved to their second positions.

BRIEF DESCRIPTION OF DRAWINGS

FIGS. 5-7 are schematic circuit diagrams of three different embodiments of motor protectors of this invention interconnected with the winding sections of a three-phase motor;

FIGs. 5A-7A are diagrammatic representations of the three-phase motor protector embodiments of FIGS. 5-7, respectively, shown in their normal or closed modes;

FIG. 5B shows the protector of FIG. 5A in its tripped mode;

Corresponding reference characters indicate corresponding parts throughout the several views of the drawings.

DESCRIPTION OF PREFERRED EMBODIMENTS

Figure 1:
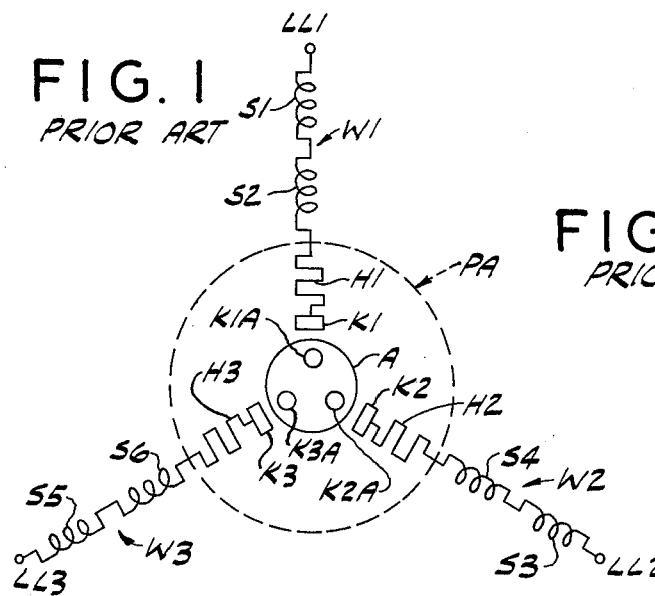
FIG. 1 is a schematic circuit diagram illustrating a prior art protector for a three-phase motor energized by a power source of a relatively high voltage level.
Figure 1A:
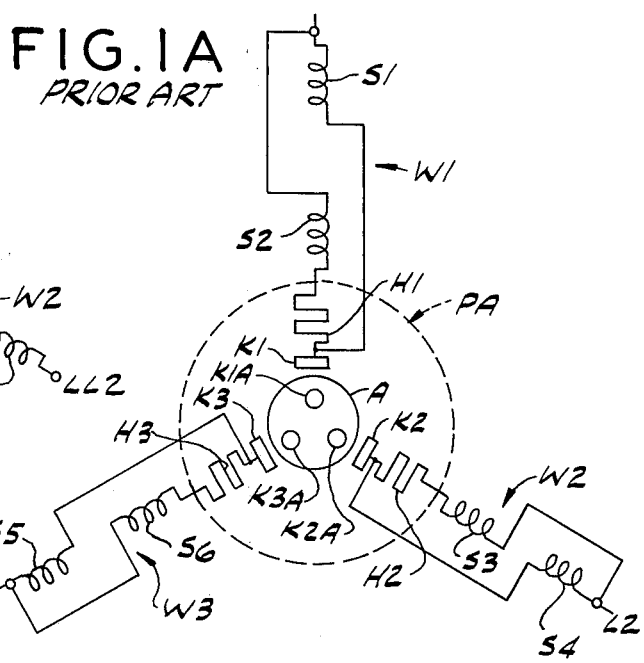
FIG. 1A is a schematic circuit diagram illustrating the interconnections of the same motor and prior art protector when energized by a power source of a lower voltage level and providing about one-half the voltage applied in FIG. 1.

As background for a description of the present invention a typical prior art thermal protector PA is illustrated in FIGS. 1 and 1A connected to a conventional three-phase dual voltage motor having three Y-connected winding phases W1, W2 and W3. Each phase winding has the usual two winding sections S1, S2 (for W1), S3,S4, (for W2) and S5,S6 (for W3) shown in FIG. 1A to be respectively shunt-connected when energized by a first lower voltage (e.g., 230 v.a.c.) power source L1,L2,L3 and shown in FIG. 1 to be serially connected when energized from a second and higher voltage (e.g., 460 v.a.c.) source, LL1,LL2,LL3. When connected in the latter configuration the current flowing in each phase winding (assume 10 amps.) also flows through heaters H1,H2,H3 and contacts K1,K2,K3 of protector PA. At temperatures below the tripping or actuation temperature of a thermal actuator A, three contacts K1A, K2A and K3A, which are welded thereto, are engaged with contacts K1,K2,K3. This actuator or element A is preferably a snap-acting dish-shaped body or disk of thermostat metal such as bimetal, two layers of which have different coefficients of thermal expansion. Such thermal disk actuators are shown in U.S. Pat. No. 1,448,240. The phase currents of this Y-connected motor circulating in the disk between the contacts K1A, K2A and K3A produce a heating effect proportional to the square of 10 amps flowing through heaters H1,H2 and H3.

When the user wishes to energize this motor from the lower voltage power source L1,L2,L3 the wiring in the motor conduit box is modified as shown in FIG. 1A so that the winding sections of each phase are shuntconnected but in such a way, as shown, that the heaters H1,H2,H3 carry the same current (assumed to be 10 amps.) as each of the winding sections. However, the interphase circulating currents in the actuator disk A produce a heating effect proportional to the square of 20 amps. Thus in addition to the radiant heat transfer from heaters H1–H3 to actuator A, there is self-heating thereof because of these circulating currents. As the heat thereby generated is a function of the square of the current, the self-heating effect in the actuator when the motor is connected as shown in FIG. 1A is four times that when the motor is connected in the FIG. 1 configuration to a high voltage source LL1,LL2,LL3. As discussed in the background of this invention, several and serious disadvantages result from this difference in current flow in the actuator when the protector is connected for energization to either low or high voltage power sources.

Figure 2:
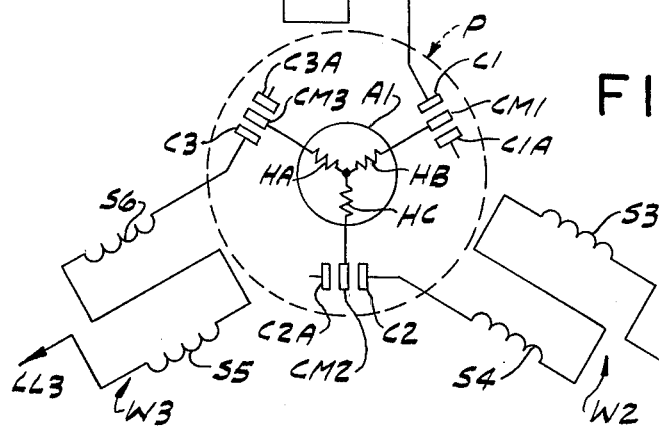
FIGS. 2 and 2A are schematic circuit diagrams of a protector of the present invention as interconnected to the windings of a three-phase motor when energized from higher and lower voltage power sources, respectively.
Figure 2A:
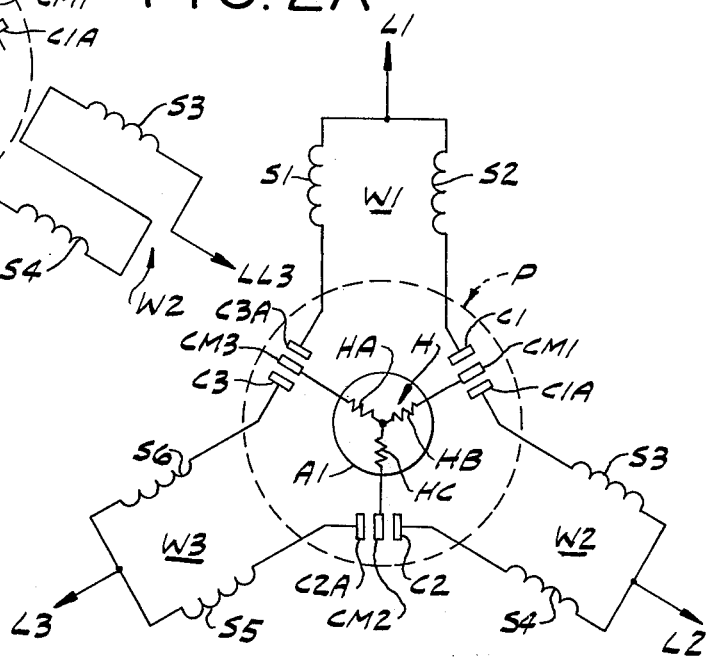

In accordance with the present invention a motor protector, such as schematically depicted at P in FIGS. 2 and 2A is provided. In such protectors currents of the same magnitude flow through the winding sections S1–S6 of the motor and through contact means CM1, CM2 and CM3 when protector P is operating in its normal closed contact mode. This is in contrast to the protector PA of FIGS. 1 and 1A where the currents flowing through contacts K1, K2 and K3 in FIG. 1A are twice those carried by these contacts when connected in the FIG. 1 configuration. Thus in FIGS. 2 and 2A heater means H constituted by heater sections represented by HA, HB and HC all will carry the same current whether connected to the high or low voltage power source. Thermal actuator A1 of motor protector P in this illustrative representation of the present invention is not shown interconnected so as to carry any current, but as will subsequently appear, it may carry all or some portion of the circulating or interphase currents, but again these currents will be the same whether the winding sections are connected in series or parallel to high or low voltage power sources.

Figure 3:
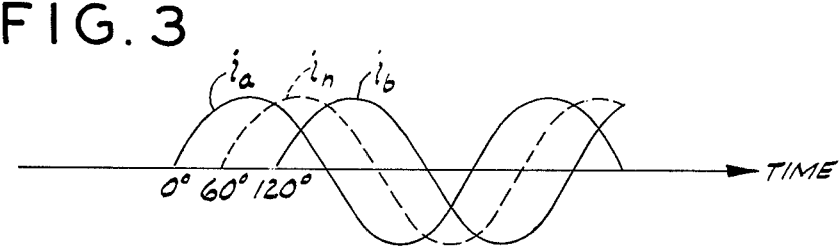
FIG. 3 illustrates the phase relationships of currents flowing in the motor protectors of the present invention.
Figure 4:
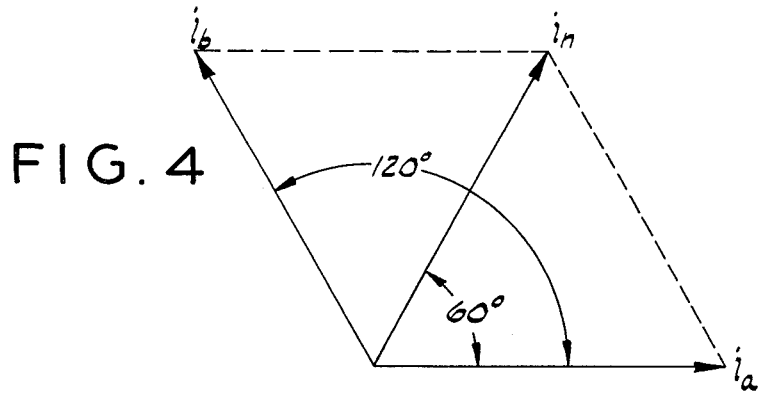
FIG. 4 is a vector representation of phase currents in a motor protector of this invention.

It will be noted that in FIG. 2A the winding sections of any one phase are connected to two different heater portions when the actuator is operating below its trip temperature. Thus contact C3A is connected to one end of winding section S1 of phase winding W1 and contact C3 is connected to one end of winding section S6 of adjacent phase winding W3. Thus there is, in effect, phase group current mixing in FIG. 2A as contrasted to maintaining phase group current integrity in FIG. 1A. As a result the same scalar currents will flow in protector P when the motor windings are energized from either voltage level power source. These equal scalar current flows are illustrated in FIGS. 3 and 4 which show the relationship of instantaneous currents $i_a$ and $i_b$ flowing in any two adjacent phase winding sections of FIG. 2A (e.g., S1 of W1 and S6 of W3) to $i_n$, the resultant current carried by any of the protector contact means CM1,CM2,CM3, when $I$ is the maximum motor current and $\theta$ and $\lambda$ are the phase angles of the phase winding section currents:

$I \sin \theta = i_a$
$I \sin \lambda = i_b$
$I \sin \theta + I \sin \lambda = i_n$
$2I \sin \frac{1}{2} (\theta + \lambda) \cos \frac{1}{2}(\theta - \lambda) = i_n$
$\lambda = \theta + 120$
$2I \sin \frac{1}{2} (2\theta + 120) \cos \frac{1}{2} (-120) = i_n$
$2I \sin (\theta + 60) \cos (-60 = i_n$
$I \sin (\theta + 60) = i_n$
Therefore, $i_n = i_a, i_b$ From the above it is apparent that the current magnitude of $i_n$ is equal to the phase currents of $i_a$ and $i_b$ of any two adjacent phases, but that the phase angle therebetween is 60°. Accordingly the present invention has the unique characteristic of producing the same scalar current levels in the protector when the motor is operated from both high and low voltage sources.

The three different embodiments of thermal protectors of the present invention schematically shown in FIGs. 5–7 have the same advantageous characteristics and operate in accordance with the same principles as described above in regard to FIGS. 2 and 2A. It will be understood that the interconnections of the FIGS. 5–7 embodiments to the higher voltage power source LL1,LL2,LL3 will be the same as that shown in FIG. 2. Thus only one contact of each of the respective pairs of contacts C1,C1A; C2,C2A; and C3,C3A will be connected to the serially connected winding sections of each phase winding in such configuration.

Referring first to FIGS. 5 and 5A, a snapacting dish-shaped disk A2 carries an electrical resistance heater means or assembly H1 of a material such as a nickel-chromium alloy, constituted by three portions represented by heater portions H1A, H1B and H1C. Heater H1 is loosely secured to thermal element A2 by three rivets R located at three positions equally spaced radially from the center of the disk and substantially equidistant from each other and spaced at 120° intervals. Contact means CM1, CM2 and CM3 (as the identical contact means CM1—CM3 and identical contact pairs C1,C1A; C2,C2A; and C3,C3A are positioned at 120° from each other, only one phase is illustrated) are respectively carried by support arms SA of heater means H1 and each is constituted by a double-faced contact. Heater H1 is loosely secured as indicated at R by rivets to actuator A2 at three positions equally spaced from the center thereof and substantially equidistant one from the others. Actuator A2 is supported centrally and loosely by a double-headed support post T threadably engaged with an insulating base B of motor protector P1. When in its normal or first curvature position as shown in FIG. 5A, the opposite faces of the double-faced contact means CM3 are engaged by contacts C3 and C3A. The former contact is secured to base B of actuator P1 while contact C3A is secured to the edge of the disk A2 by an insulating bushing S. Contact C3A is electrically connected to winding section S1 by a length of flexible metallic conductor braid D. Heater means H1 is schematically depicted in FIG. 5 as a triangular or delta-shaped set of three resistance legs, H1A, H1B and H1C, to more nearly correspond to a preferred physical configuration of these heating means as utilized in the embodiments of FIGS. 5A, 6A, 8 and 9. The points of physical attachment of heater means H1 to the undersurface of disk actuator A2 are indicated schematically in FIG. 5 by R at the three apices of H1.

In operation, substantially all of the circulating phase current carried by CM1, CM2 and CM3 will traverse the heater legs H1A, H1B and H1C inasmuch as the loose rivet connections R constitute poor electrical paths for current flow. However, whatever currents are carried by the actuator A2 they will be the same whether the motor is connected to the higher or lower voltage power source. Thus, any self-heating effect because of current flow through disk actuator A2 will be the same regardless of the interconnection of the motor to the higher or lower voltage sources.

When, because of an overcurrent condition, the temperature of actuator A2 rises to a level at which it will trip, its curvature will reverse abruptly lifting both contact C3A and double-faced contact CM3 away from fixed contact C3. As contact C3A is secured to the outer margin or edge of actuator A2 at a distance twice that of the distance from the center thereof to point R where the heater means is loosely secured to the actuator A2, contact C3A will move to a position twice as far from contact C3 as CM3 moves, thus providing substantially equal spacing between the opposing faces of double-faced contact CM3 and the faces of contacts C3 and C3A. As the other sets of contacts are spaced at 120° and are otherwise symmetrical relative to the centerpost T, the same action occurs simultaneously at all three contact sets. It will be noted that not only when the actuator is in its normal closed position of FIG. 5A but also when it is in the tripped position of FIG. 5B, heater H1 is held in close thermal transfer relationship to the undersurface of actuator A2 transferring heat both conductively and by radiation as well as by convection. Thus the heaters may be operated at relatively low temperature (e.g., 1,000°F. or less) thereby avoiding heater burnout, and without reducing the trip temperature thereby minimizing any tendency for nuisance tripping at high ambients. Also, the actuator is rapidly responsive to the heat generated by current flow in heater H1 during normal operation.

As this heater is carried upwardly when tripping occurs, this good heat-exchange relationship is maintained so that actuator A2 will tend to cool more slowly than if the heater were fixed in position relative to the base of the protector. This advantageously prolongs somewhat the "off" time of the protector during overload tripping and recycling.

Motor protector P2 of FIGS. 6 and 6A is quite similar in operation to P1 described above but instead of having contacts C1A, C2A and C3A secured to the margin of actuator A2 they are fixed to the protector base B as indicated in FIG. 6A. Also a contact means CM3A is constituted by a pair of contacts X3 and X3A (contact means CM1A and CM2A being similarly constituted) which are mounted on opposite ends of a yoke Y riveted at R1 to the heater means H1. The tripping of protector P2 therefore abruptly simultaneously lifts contacts X3 and X3A from contacts C3 and C3A.

Figure 8:
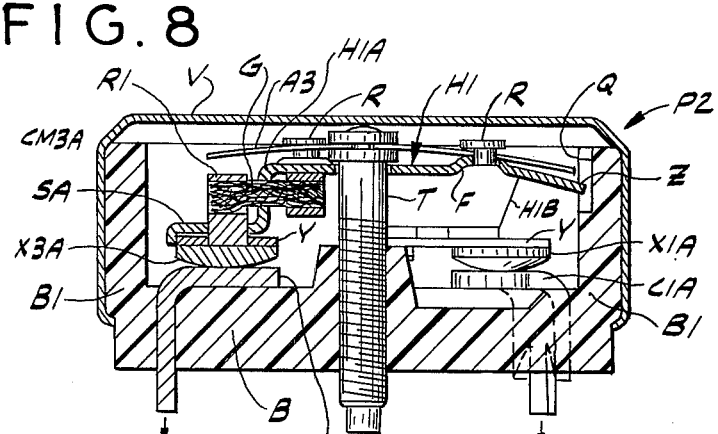
FIG. 8 is a cross-section of the motor protector embodiment shown in FIGS. 6 and 6A.
Figure 9:
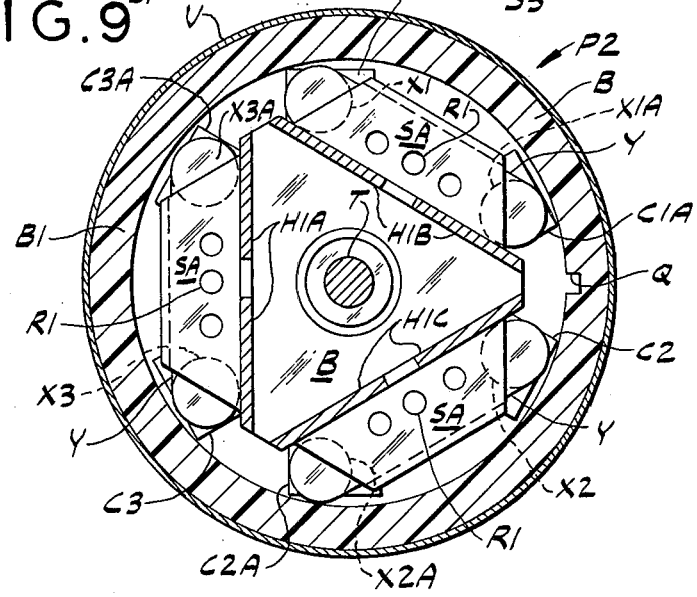
FIG. 9 is a cross section of FIG. 8.

A more detailed illustration of this embodiment of FIGS. 6 and 6A is shown in FIGS. 8 and 9, wherein all three pairs of fixed contacts C1,C1A; C2,C2A; and C3,C3A are shown in FIG. 9 with mating movable contacts X1,X1A; X2,X2A; and X3,X3A illustrated in phantom. Base B of protector P2 is shown to include an upstanding sidewall B1 and a cap or cover V, preferably of steel to act as a magnetic shunt around the contacts to minimize any adverse effect of the motor's magnetic field so as to avoid any prolonging of arcing between separating contacts upon tripping under locked rotor conditions, etc. Actuator A3 includes a tab Z projecting laterally from one edge thereof for engagement in a slot Q formed in sidewall B1 to avoid any rotational movement of A3 and its associated heater and contacts relative to the three pairs of fixed contacts, but freely to permit vertical movement of actuator disk A3 when it reverses curvatures.

Heater means H1 is shown to include the three heater portions H1A, H1B and H1C constituted by a generally flat triangular base which has apertured dimpled portions F at the apices through which the rivets R project. The central portion of the heater base is open and the heater includes three flanges extending perpendicularly away from the heater base and the inner surface of disk actuator A3. The heater H1 is preferably formed of a perforated stamping to improve resistance and provide good circulation characteristics. Support arms SA are integrally formed and extend outwardly to carry contact means CM1A, CM2A and CM3A welded to the ends of yokes Y. These yokes are loosely secured by rivets R1 so as to be rockably carried by support arms SA of H1. In order to insure low resistance paths to the heater portions H1A, H1B and H1C from the movable contacts and yokes, a section of flexible conductive braid G is utilized to interconnect each rivet R1 to the midpoints of heater portions H1A, H1B and H1C. This permits limited rocking action of the yokes and their associated contacts relative to the support arms SA of the heater means while still maintaining a high conductivity path between these yoke contacts and the heater portions.

Calibration of P2 to adjust it to trip at a given preselected temperature is accomplished by rotating post T concomitantly to move actuator A2 and the contact means CM1, CM2 and CM3 toward and away from the three pairs of fixed contacts.

FIG. 7A differs from the foregoing embodiments in that actuator disk A4 carries three separate and flexible electrical resistance heaters H2A, H2B and H2C riveted securely at R2 to provide good electrical connections at 120° intervals to the outer margin thereof. The other ends of the heaters each carry a yoke Y riveted thereto as indicated at R3. In this embodiment the interphase or circulating current is carried by the actuator A4 and causes self-heating. But as the phase currents and circulating currents are the same through the heaters and A4, operation of P4 will not be affected by changing the interconnection of the motor windings from high to low voltage. And again the heaters will be carried with the actuator and maintained in good thermal contact and heat exchange therewith when it reverses curvature when tripped.

The motor protectors of this invention may be conveniently mounted not only on or in the end bells but on the motor windings and a fewer number of different product lines thereof will meet the requirements for use in various different motors of different manufacturers.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A protector for a multiphase dual voltage electric motor in which the same scalar current levels are present in the protector when the motor is operated from both high and low voltage sources, each winding phase of which comprises two winding sections adapted to be shunt-connected when energized by a power source of a first lower voltage level and to be serially connected when energized by a power source of a second higher voltage level substantially double that of said first level, said protector comprising:

a snap-acting dish shaped body comprising at least two layers of metallic material having different coefficients of thermal expansion and which has a first curvature at ambient temperatures and abruptly reverses its curvature when heated above a predetermined temperature;

electrical resistance heater means carried by said snap-acting body in heat exchange relationship therewith;

a plurality of contact means equal in number to the number of motor winding phases, said contact means being electrically interconnected to said heater means and supported thereby for simultaneous movement of said snap-acting body from respective first positions when the snap-acting body is in its first curvature position to respective second positions when said body reverses curvature in response to the body being heated above said predetermined temperature; and a pair of contacts associated with each contact means, one contact of each pair adapted to be connected to one end of a winding section of a respective winding phase, the other contact of each pair adapted to be connected to one end of a winding section of an adjacent phase winding when the motor is energized by the lower voltage level power source and electrically disconnected from all winding sections when the motor is energized by the higher voltage level power source thereby resulting in the same scalar current levels in the protector from both high and low voltage sources, each of said pairs of contacts being mutually contacted by its respective contact means when the latter are in their first positions and mutually isolated therefrom when the contact means are simultaneously abruptly moved to their second positions.

2. A protector as set forth in claim 1 wherein the heater means comprise three support arms carrying respective contact means adjacent the outer ends thereof, said heater means being secured to the snap-acting body at three positions equally spaced radially from the center thereof and substantially equidistantly each from the others whereby the phase currents flowing from the respective contact means through the heater means and the snap-acting body when said winding sections are shunt-connected to said first lower voltage are substantially equal to the phase currents flowing through the heater means and the snap-acting body when the winding sections are series connected to said second higher voltage.

3. A protector as set forth in claim 2 wherein said heater means are riveted to the snap-acting body at each of said three positions.

4. A protector as set forth in claim 3 wherein the snap-acting body is secured centrally to a post that is adjustable to move said contact means concomitantly toward and away from the respective pairs of contacts thereby to calibrate said protector to reverse its curvature at a selected predetermined temperature.

5. A protector as set forth in claim 4 wherein each contact means cmprises a commonly connected second pair of contacts adapted to mate with and bridge respective associated first said pairs of contacts when said snap-acting body is in its first curvature position.

6. A protector as set forth in claim 5 wherein each commonly connected second pair of contacts are secured to opposite ends of a yoke the central portion of which is riveted to a respective support arm of the heater means.

7. A protector as set forth in claim 6 in which said heater means comprises a generally flat triangular base of electrical resistance material loosely riveted at its corners to said dish-shaped body at said three positions, said base having three flanges extending generally perpendicularly away from the base and the dish-shaped body, said three support arms extending outwardly from the flanges in a plane generally parallel to that of the base.

8. A protector as set forth in claim 7 in which the yokes are loosely riveted to the support arms to permit limited rocking action as said second pairs of contacts are moved into and out of engagement with the first said pairs of contacts as said dish-shaped body snaps between first and second curvatures.

9. A protector as set forth in claim 8 which includes a flexible conductive shunt between each of said yokes and the base of the heater means.

10. A protector as set forth in claim 2 wherein one contact of each of said pairs of contacts is secured to the outer margin of said snap-acting body at a distance substantially twice that of the distance from the center thereof to each of the points of securement of the heater means, and wherein each contact means comprises a double-faced contact the opposite faces of which are adapted to engage the respective contacts of the associated pair when said snap-acting body is in its first curvature position and wherein the contacts carried on the outer margin of said snap-acting body move approximately twice the distance away from the other contacts of said pairs as that distance the double-faced contacts move away upon the snap-acting body reversing curvature thereby providing substantially equal spacing between the opposing faces of the double-faced contacts and the contacts of said pairs of contacts.

\* \* \* \* \*